United States Patent [19]
Rath

[11] 3,782,510
[45] Jan. 1, 1974

[54] DISC BRAKE AND SUPPORT STRUCTURE THEREFOR

[75] Inventor: Heinrich Bernhard Rath, Koblenz, Germany

[73] Assignee: Girling Limited, Birmingham, England

[22] Filed: May 25, 1971

[21] Appl. No.: 146,751

[30] Foreign Application Priority Data
May 29, 1970 Great Britain..................... 25968/70
Oct. 22, 1970 Great Britain..................... 50096/70

[52] U.S. Cl.............................. 188/73.3, 188/73.5
[51] Int. Cl........................................ F16d 55/224
[58] Field of Search................. 188/73.4, 72.4, 73.5, 188/73.3

[56] References Cited
UNITED STATES PATENTS
3,616,876  11/1971  Brooks............................. 188/73.3

Primary Examiner—George E. A. Halvosa
Attorney—Scrivener Parker Scrivener and Clarke

[57] ABSTRACT

In a disc brake of the sliding caliper reaction type friction pad assemblies for engagement with opposite faces of a rotatable disc are located in the caliper which slides in a direction parallel with the axis of the disc between a pair of circumferentially spaced guiding members forming part of a stationary drag-taking member. The oppositely facing innermost faces of the guiding members are each formed with at least three axially and radially spaced co-planar surfaces upon which the caliper is directly slidably guided.

18 Claims, 20 Drawing Figures

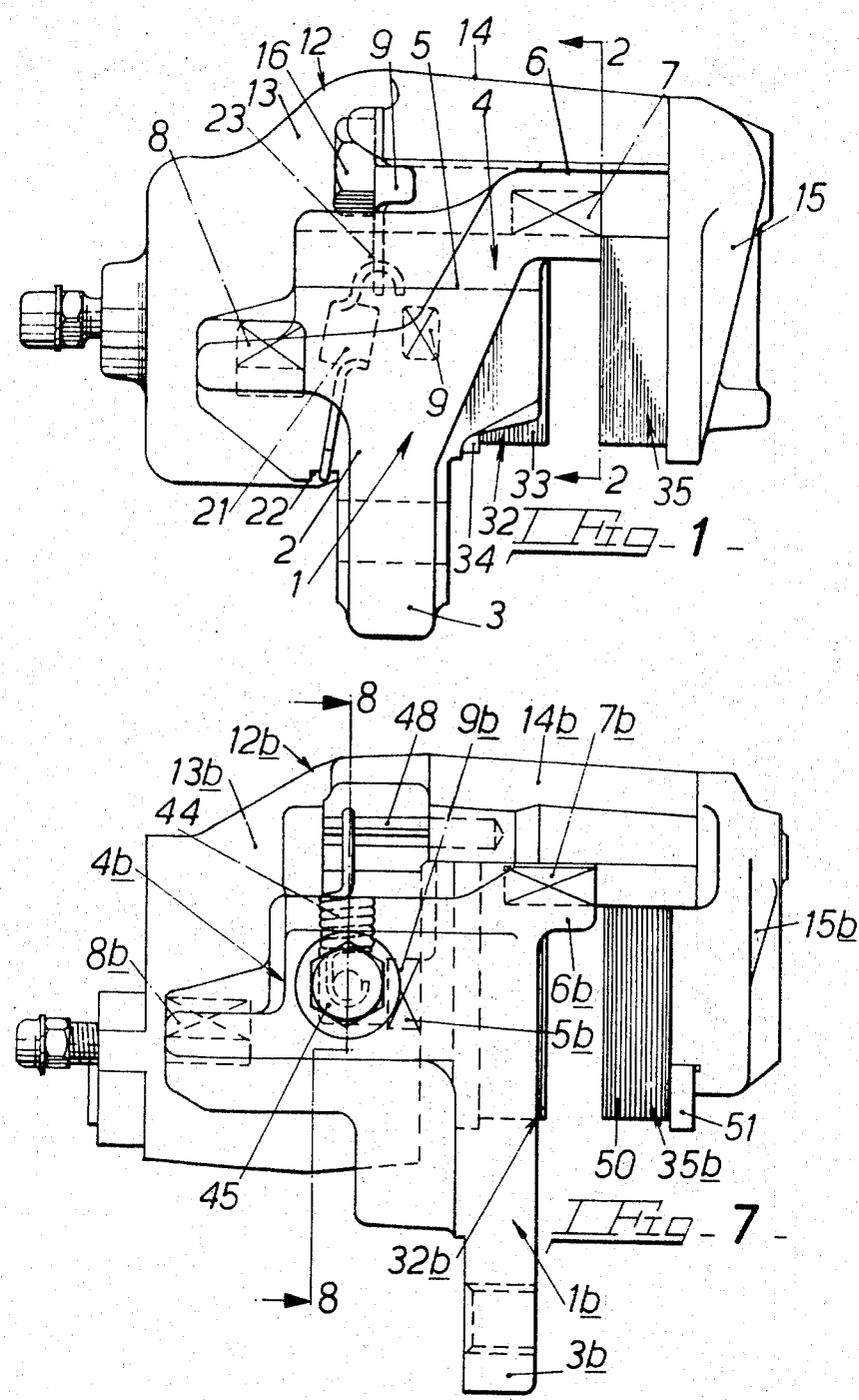

PATENTED JAN 1 1974  3,782,510
SHEET 03 OF 11
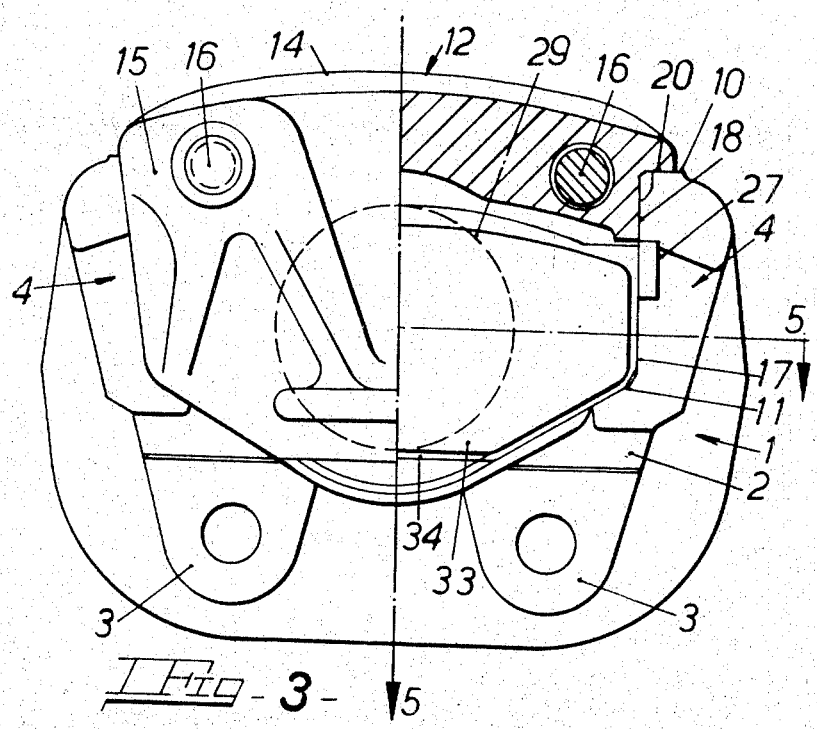
Fig-3-
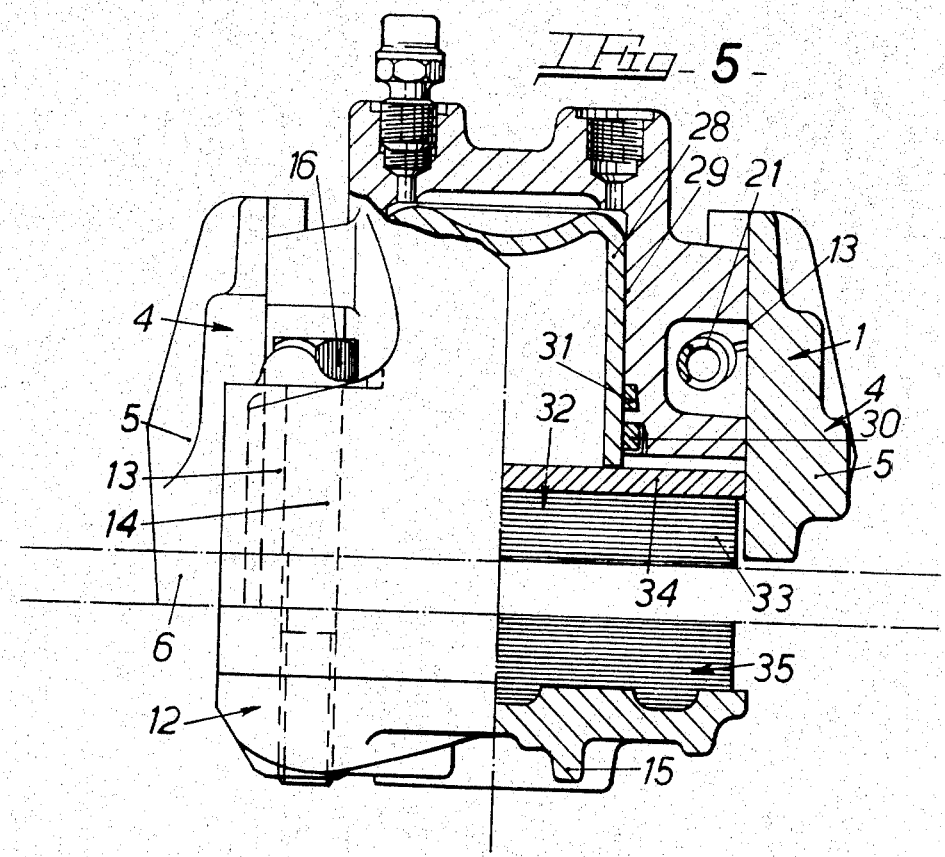
Fig-5-

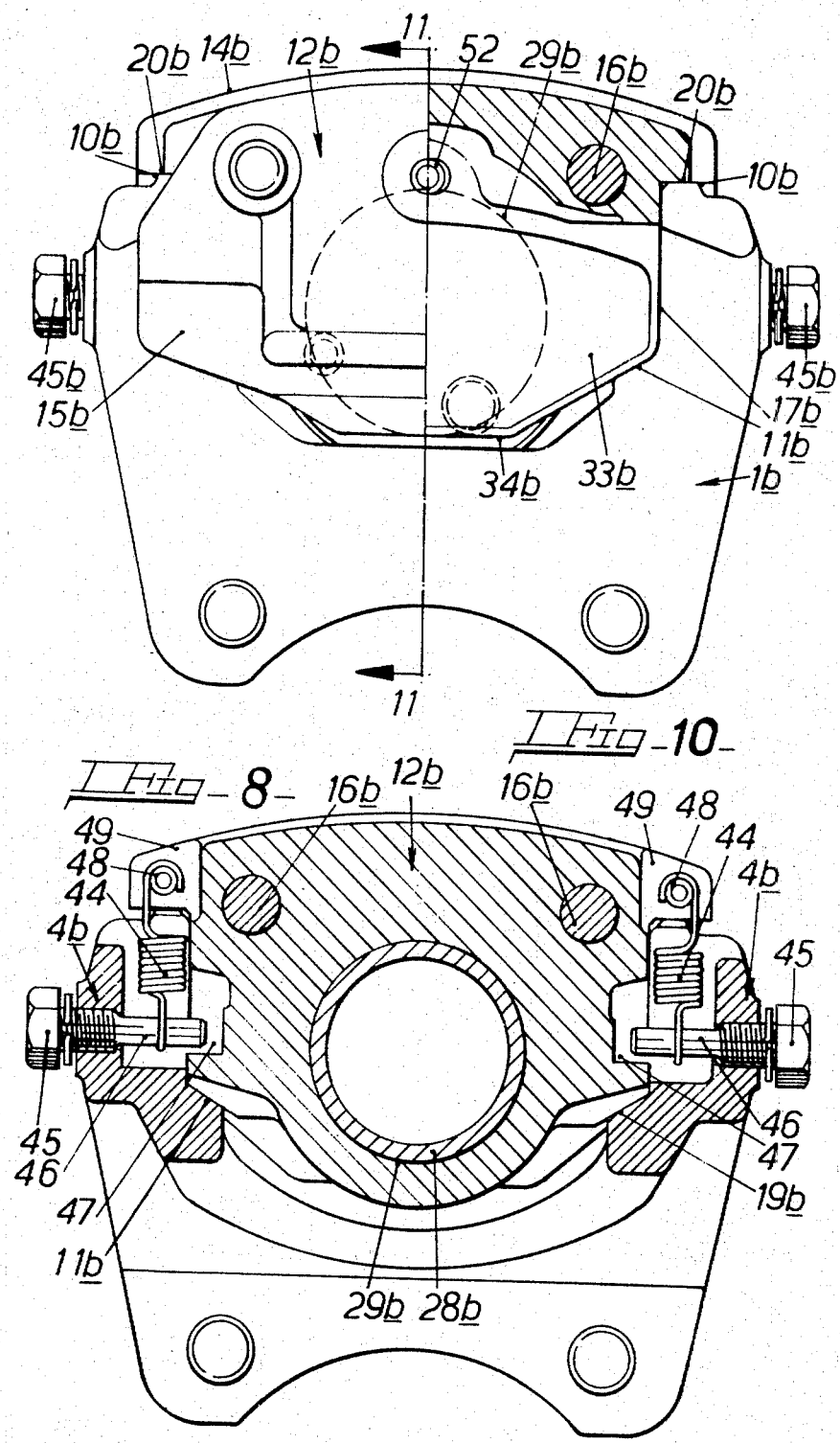

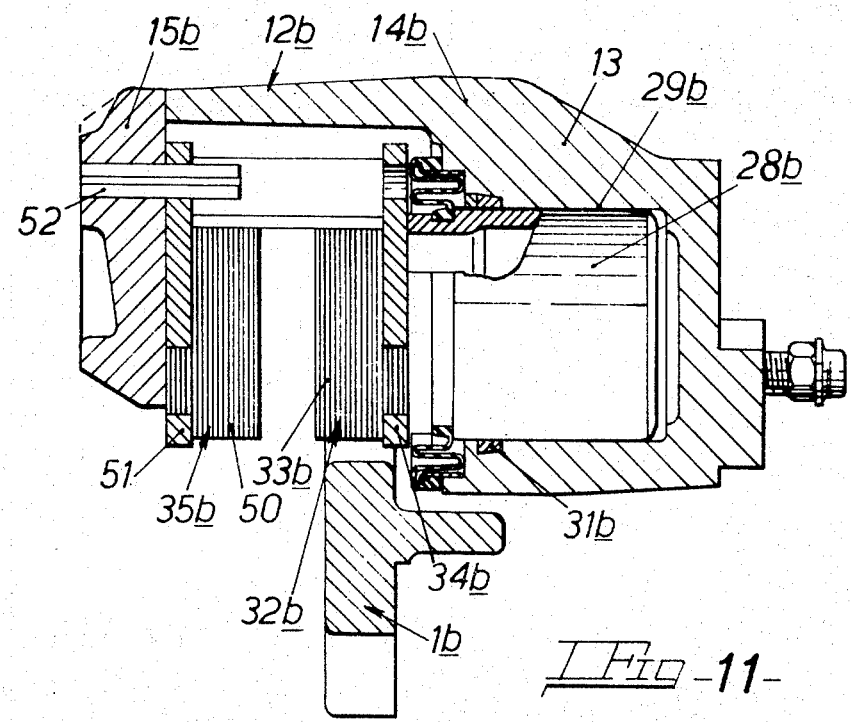
Fig-11-
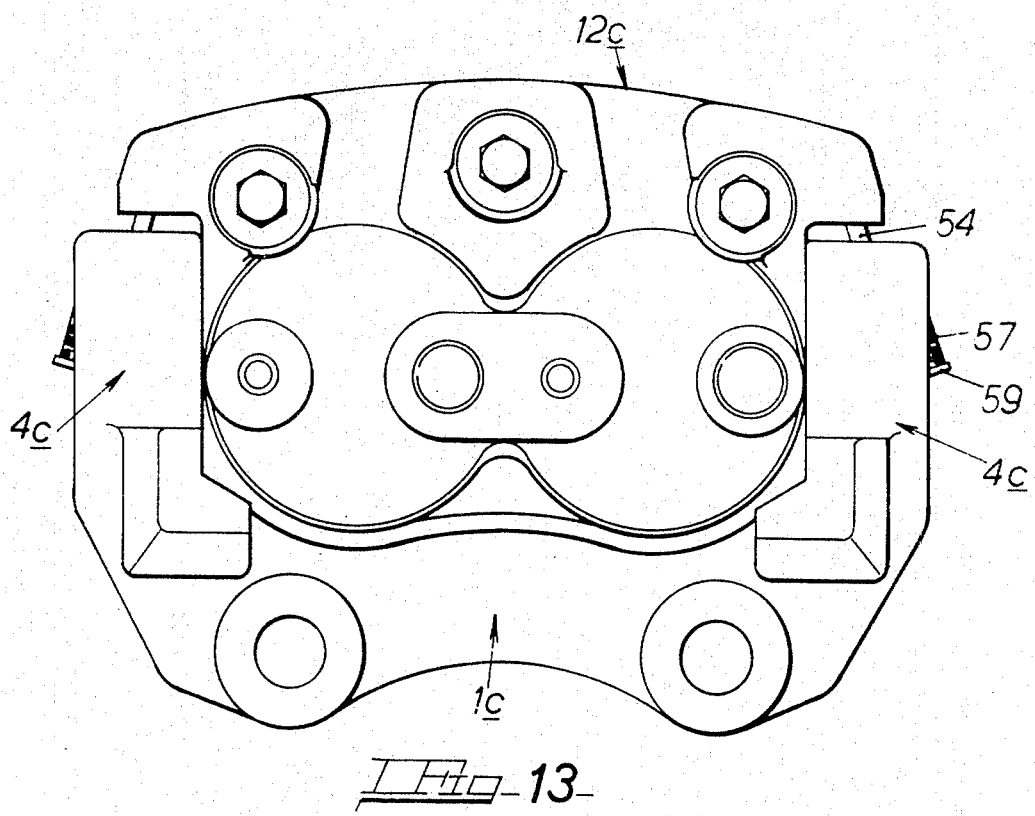
Fig-13-

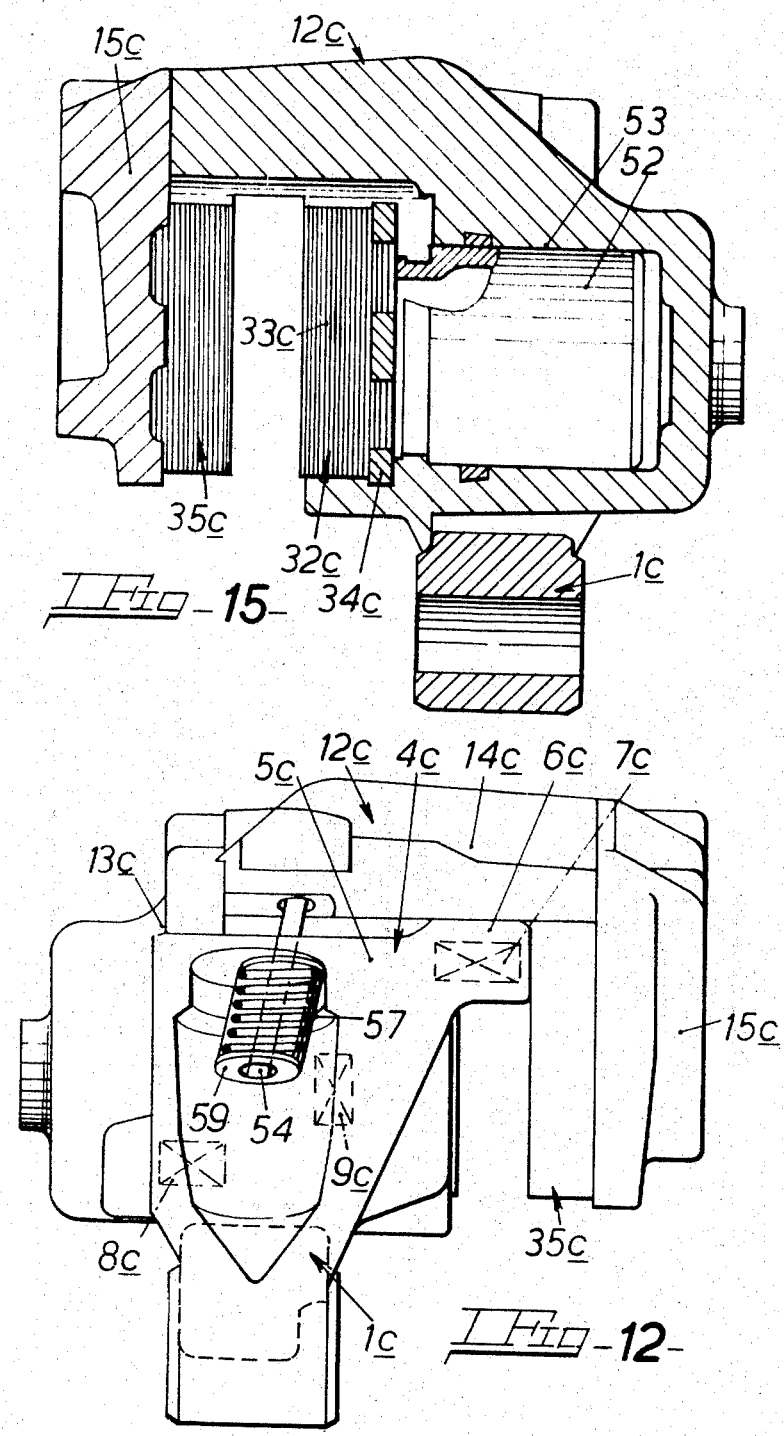

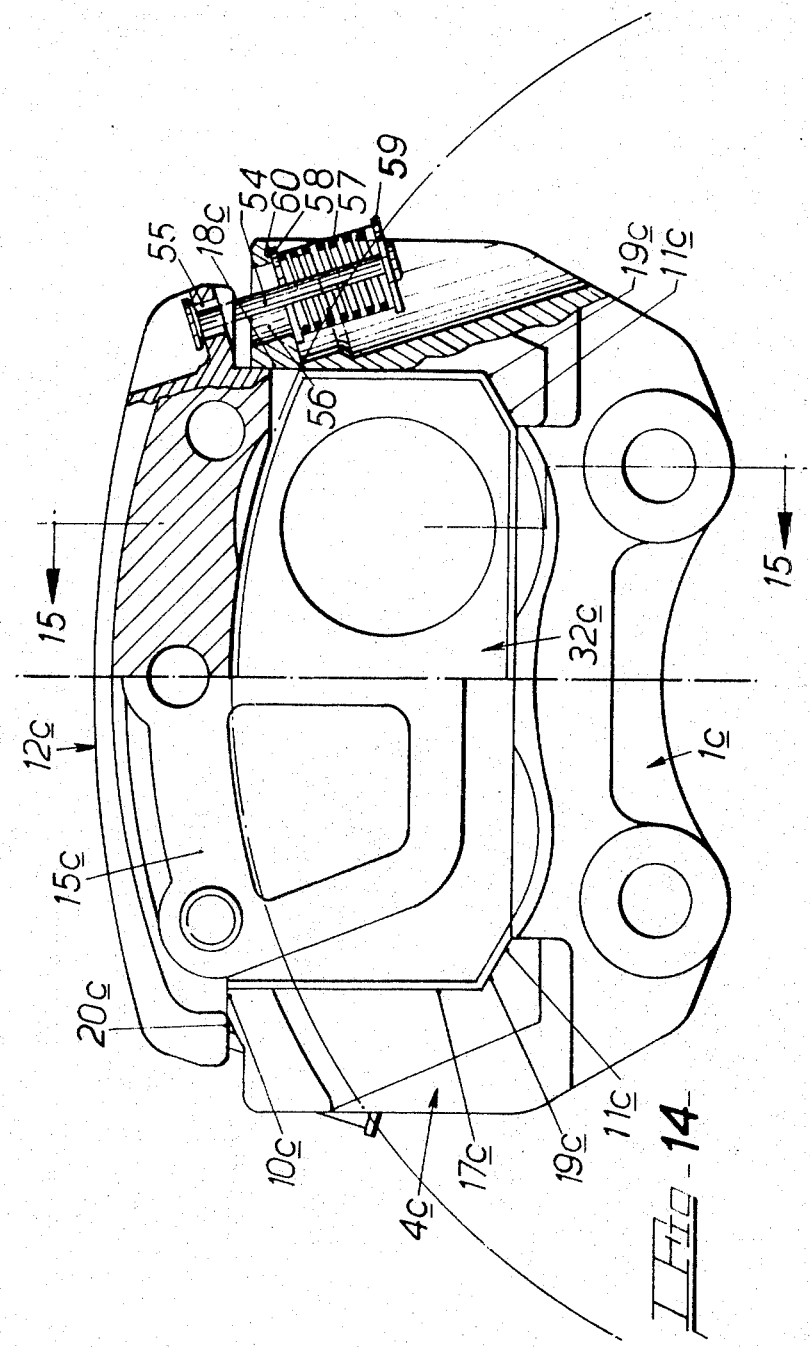

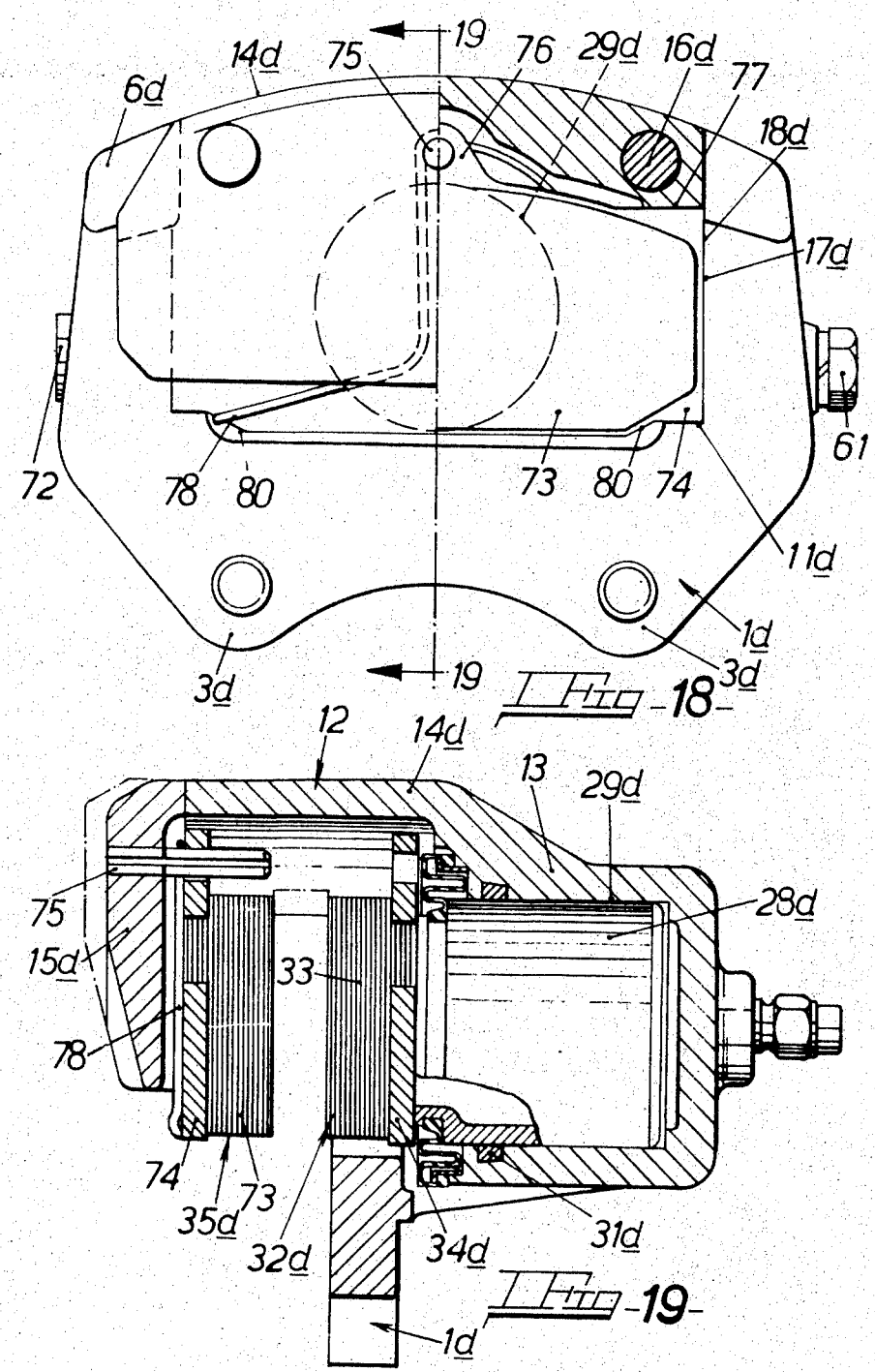

DISC BRAKE AND SUPPORT STRUCTURE THEREFOR

SPECIFIC DESCRIPTION

This invention relates to disc brakes for vehicles of the kind in which friction pad assemblies for engagement with opposite faces of a rotatable disc are located in a caliper which straddles a portion of the peripheral edge of the disc and which is guided for movement with respect to the disc on a stationary drag-taking member adjacent to one face of the disc, and actuating means located in one limb of the caliper are adapted to apply one of the friction pad assemblies directly to one face of the disc, the other friction pad assembly being applied indirectly to the opposite face of the disc by the reaction of the applying means which causes the caliper to slide with respect to the stationary member in a direction parallel with the axis of the disc.

According to our invention in a disc brake of the kind set forth the caliper is guided for movement in a direction parallel with the axis of the disc between a pair of circumferentially spaced guiding members forming part of the stationary drag-taking member, and each guiding member comprises an arm with which is continuous an extension which extends over the peripheral edge of the disc, the oppositely facing innermost faces of the guiding members each being formed with at least three axially and radially spaced co-planar surfaces upon which the caliper is slidably guided directly for movement in a direction parallel with the axis of the disc.

Conveniently the free end of each arm terminates at a position at least substantially in alignment with the face of the disc remote from the stationary drag-taking member.

Preferably two co-planar surfaces are located at portions which terminate at opposite ends of each guiding member, and the third surface is located at a position intermediate opposite ends of the guiding member.

The provision of the third pair of surfaces serves to reduce the resultant moment on the caliper which tends to turn the caliper angularly about its main longitudinal axis in the application of the brake.

The radially innermost and outermost ends of the arms lead into inwardly and outwardly extending shoulders which form supports preventing movement of the caliper in an inward direction.

Preferably the shoulders at the radially innermost ends also form supports preventing movement in a radially inwards direction of a friction pad assembly adapted to be applied to the disc by actuating means housed in the limb of the caliper which is guided in the stationary drag-taking member.

Conveniently the caliper is biassed into engagement with the shoulders at the radially innermost and outermost ends of the arms by resilient means acting between the caliper and the stationary drag-taking member.

The resilient biassing means may take any convenient form. For example the resilient biassing means may comprise a pair of circumferentially spaced tension springs acting at opposite ends between the stationary member and the caliper. Alternatively the resilient biassing means may comprise circumferentially spaced compression springs.

In either case conveniently the springs are combined with coupling means co-operating with adjacent parts of the stationary member and the caliper to prevent separation of the caliper and the stationary member upon failure of the biassing means. For example, each arm is provided at an intermediate point in the radial depth of its circumferentially innermost face with a longitudinally extending groove in which is received an adjustable tongue preferably forming part of a tab washer and carried by the caliper to provide an independent closed locking connection between the caliper and the stationary drag-taking member and limit relative movement in a radial direction between the caliper and the stationary drag-taking member should either or both of the resilient biassing means fail or otherwise become damaged.

The actuating means preferably comprises a piston working in an hydraulic cylinder bore in the limb of the caliper hwich is guided in the stationary drag-taking member. Alternatively the actuating means may include a mechanical actuating mechanism which in turn may incorporate an automatic adjuster.

Embodiments of our invention are illustrated in the accompanying drawings in which:

FIG. 1 is a side elevation of an hydraulically operated disc brake;

FIG. 3 is an elevation of the opposite end of the brake including a part section showing the directly actuated friction pad assembly:

FIG. 5 is a plan of the brake including a part section on the line 5—5 of FIG. 3;

FIG. 7 is a side elevation of a further form of hydraulically operated disc brake;

FIG. 8 is a section on the line 8—8 of FIG. 7;

FIG. 10 is a part sectioned elevation of one end of the brake shown in FIG. 7;

FIG. 11 is a section on the line 11—11 of FIG. 10;

FIG. 12 is a side elevation of yet a further modified form of hydraulically operated disc brake;

FIG. 13 is an elevation of one end of the brake illustrated in FIG. 12;

FIG. 14 is a part-sectional elevation of the opposite end of the brake;

FIG. 15 is a section on the line 15—15 of FIG. 13.

FIG. 18 is an elevation of the opposite end of the brake including a part section through the caliper on the line 18—18 of FIG. 16;

FIG. 19 is a section on the line 19—19 of FIG. 18; and

Figure 4:
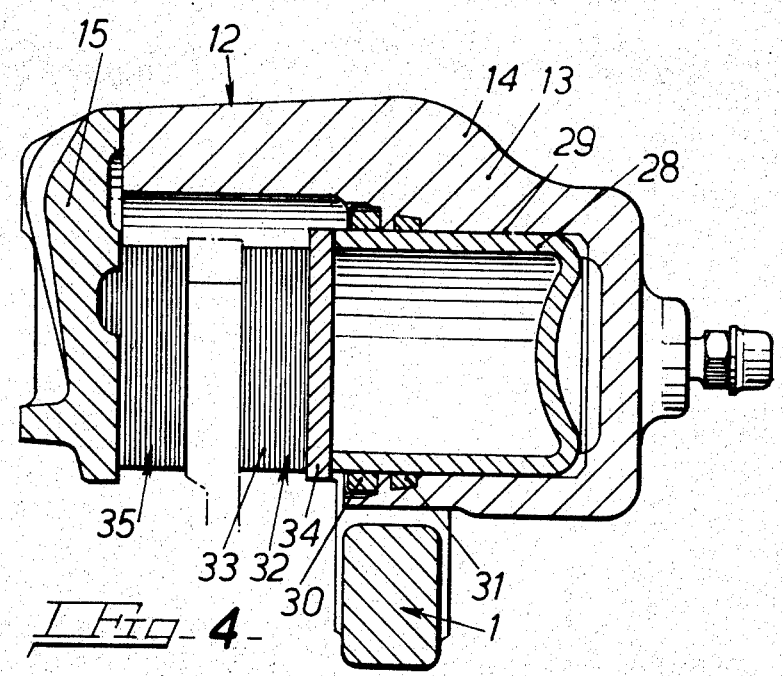
FIG. 4 is a longitudinal section through the brake.
Figure 2:
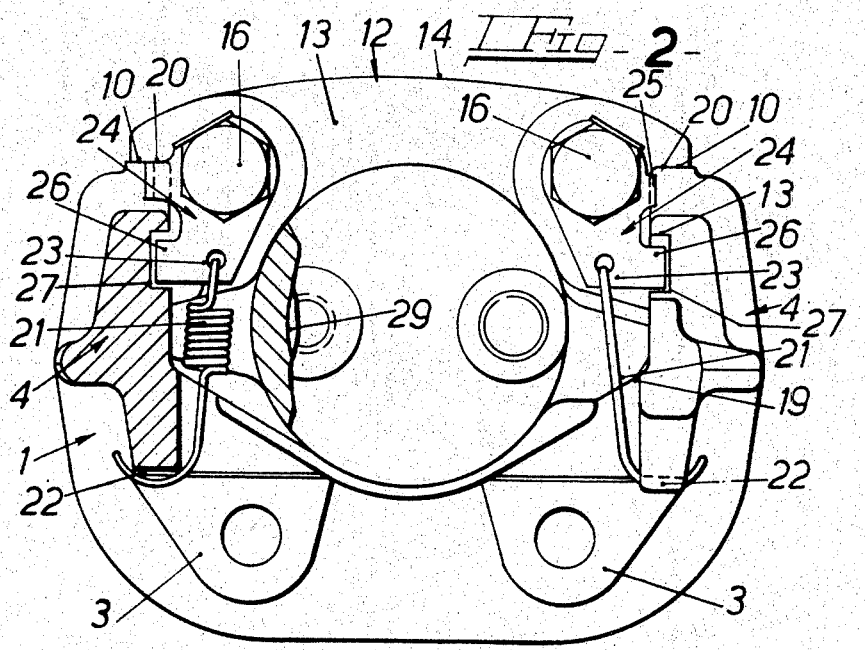
FIG. 2 is a part-sectional elevation of one end of the brake including a section on the line 2—2 of FIG. 1.

In the hydraulically actuated disc brake illustrated in FIGS. 1 to 5 of the drawings 1 is a stationary drag-taking member adapted to be secured by bolts to a fixed part adjacent to one face of a rotatable disc (not shown).

The stationary drag-taking member 1 is of one-piece construction, preferably a casting, and comprises a circumferentially extending bridge piece 2 which is located in a plane parallel to the axis of the disc and which is secured to the fixed part by a pair of lugs 3. A pair of axially extending circumferentially spaced guiding members 4 integral with the bridge piece 2 extend rearwardly, and forwardly and outwardly, with respect to the bridge piece 2. Each guiding member4 is constituted by an arm 5 of curved outline which, at its forward end, is continuous with an extension 6 which extends over the peripheral edge of the disc, terminating at its free end at a position aligned substantially with the face of the disc remote from the stationary drag-taking member 1.

The oppositely facing innermost faces of the extensions 6 are each formed with a guiding surface 7 which is proud of the extension and which terminates at the free end of the extension 6. A portion of the innermost face of each arm 5 at the end remote from its extension 6 is formed with a guiding surface 8 co-planar with the guiding surface 7 and proud of the arm 5. The innermost face of each arm 5 is also formed at an intermediate point in its length with a guiding surface 9 co-planar with the surfaces 7 and 8 and proud of the arm 5. The guiding surfaces 7, 9 and 8 are spaced axially from each other and the guiding surfaces 7 and 8 are spaced radially inwardly and outwardly in opposite directions with respect to the guiding surfaces 9.

Radially outermost ends of the innermost faces of the arms 5 lead into aligned outwardly directed shoulders 10, and radially innermost ends of the innermost faces of the arms 5 lead into inwardly directed shoulders 11 which are inclined away from the innermost faces of the arms 5.

A caliper 12 of generally U-shaped outline straddles the disc 1 and is mounted on the drag-taking member 1 between the guiding members 4. The caliper 12 comprises a two part assembly incorporating a limb 13 of generally L outline of which a bridge portion 14 spans the peripheral edge of the disc 1, and a limb 15, which is secured to the free end of the bridge portion 13, by means of a pair of circumferentially spaced bolts 16 which are screwed into tapped holes in the limb 15.

Circumferential end faces 17 of the limb 13 are is sliding engagement with the guiding surfaces 8 and 9 in which arms 5, and circumferential end faces 18 of the bridge portion 14 are in sliding engagement with the guiding surfaces 7 in the extensions 6.

The radially innermost end of the limb 13 is formed with oppositely inclined surfaces 19 which are complementary to and, co-operate slidably with, the shoulders 11 at the innermost ends of the arms 5 and the bridge portion 14 is formed with oppositely directed outwardly extending surfaces 20 which engage slidably with the shoulders 10 on the extensions 6.

The surfaces 19 and 20 on the caliper 12 are urged into engagement with the shoulders 11 and 10 at all times by a pair of circumferentially spaced tension springs 21 which are detachably anchored at their lowermost ends in grooves 22 in the underside of the arms 5. At their uppermost ends each spring 21 is anchored to a downwardly extending flange 23 of a tab washer 24 interposed between the caliper 12 and the head of the bolt 16 on the side of the caliper. Each tab washer 24 is formed with a downwardly extending tab 25 which is cranked with respect to the flange 23 to engage with an adjacent outer face of the limb 13 on the caliper, and opposed outwardly extending fingers 26 which are received in axially extending grooves 27 in the arms 25.

The radial and circumferential dimensions of the fingers 26 are less than the corresponding dimensions of the grooves 27 so that normally the fingers 26 do not contact the walls of the grooves 27. However, should one or both of the springs 21 break, the fingers 26 prevent the caliper 12 separating from the stationary drag-taking member 1.

The limb 13 incorporates brake applying means in the form of an hydraulic piston 28 working in a bore 29 in the limb 13. The piston 28 is of pressed steel construction and works through a wiper seal 30 in the wall of the bore 29 and a pressure seal 31 located rearwardly of the wiper seal 30.

A first friction pad assembly 32 in the form of a friction pad 33 carried by a rigid backing plate 34 is interposed between the piston 28 and the disc and is guided between the oppositely facing innermost surfaces 18 of the arms 5. The innermost edge of the backing plate 34 is guided on the shoulder 11 of the stationary drag-taking member 1, and there is a clearance therebetween to permit relative tilting between the friction pad assembly 32 and the caliper 12 to take place.

A second friction pad assembly 35 for engagement with the face of the disc remote from the stationary member 1 is secured to the inner face of the limb 15 of the caliper 12.

In the application of the brake hydraulic fluid under pressure admitted to the closed end of the bore 29 advances the piston 28 in the bore 29 to apply the friction pad assembly 32 to an adjacent face of the disc 1. Simultaneously the reaction on the caliper 12 causes the caliper to slide relative to the stationary member 1 in the opposite direction to apply the friction pad assembly 35 to the opposite face of the disc 4. The drag on the directly actuated friction pad assembly 32 is taken directly by the trailing arm 5. That is to say, the drag is taken the arm with which any point in the braking surfaces of the disc last comes into alignment in accordance with the particular direction of disc rotation. The drag on the indirectly actuated friction pad assembly 35 is transferred to the guiding members 4 through the caliper 12. Ideally the drag from the indirectly actuated friction pad assembly 35 is taken by the guiding surfaces 7 on the trailing arm 5. However, where a clearance is provided between the caliper 12 and the guidng member 4, the drag on the indirectly actuated friction pad assembly 35 produces a turning moment on the caliper 12 which acts on the surface 7 of the trailing extension 6 and reacts on the surfaces 8 and 9 of the leading arm 5.

Figure 6:
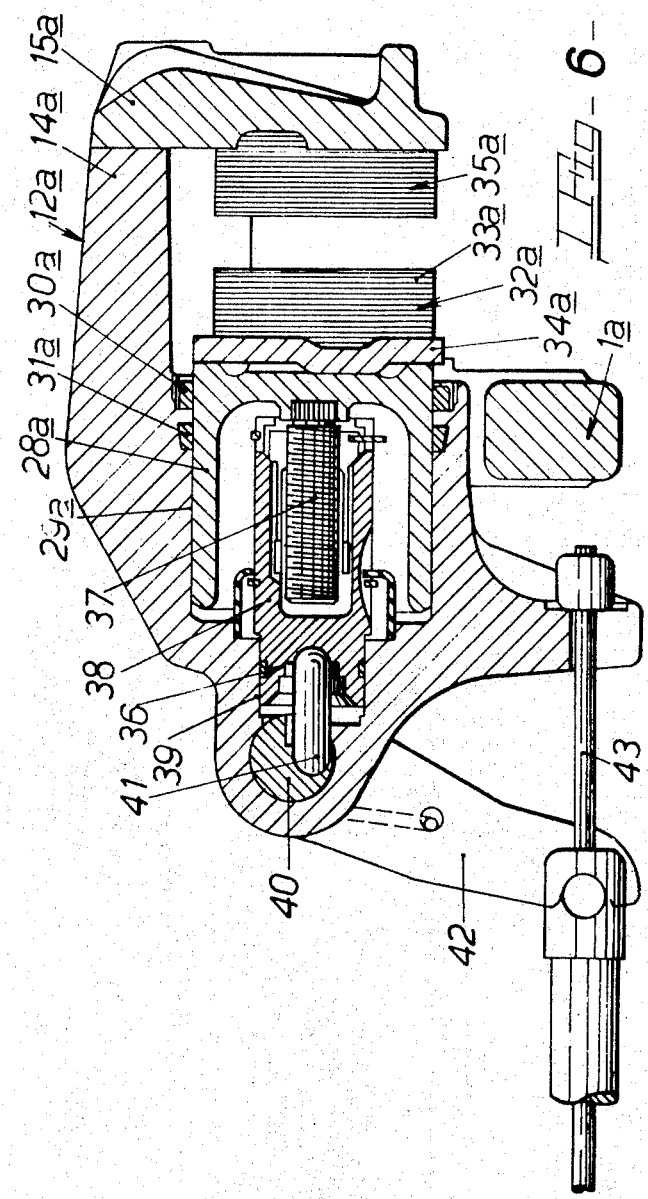
FIG. 6 is a longitudinal section similar to FIG. 4 but showing a modified brake incorporating a mechanical actuator.
Figure 9:
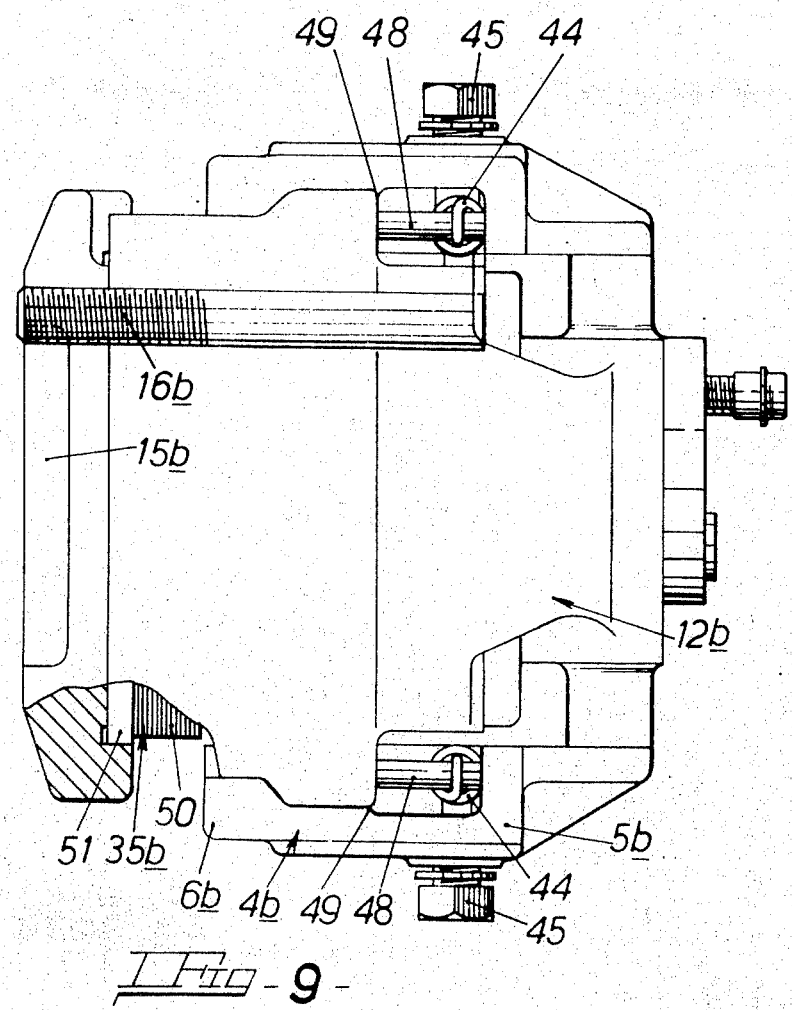
FIG. 9 is a plan of the brake shown in FIG. 7.

The modified construction illustrated in FIG. 6 is substantially identical with that described above, and corresponding reference numerals, qualified by the suffix a, have been applied to corresponding parts. However, in the construction shown in FIG. 6 the piston 28a is of hollow cup-shaped outline and acts on the directly actuated friction pad assembly 32a at its closed outermost end.

For normal service braking hydraulic fluid under pressure is admitted between the closed end of the bore 29a and the piston 28a to apply the brake as described above.

The brake includes a mechanism 36 for applying the brake mechanically. The mechanism 36 comprises a screw-threaded strut 37 secured at one end to the crown of the piston 28 and received within a sleeve 38 having a closed outer end adapted to slide in a bore 39 in the outer end of the limb 14 of the caliper 12. A cam spindle 40 acts on the sleeve 38 through an eccentrically mounted thrust member 41 to ransmit to the sleeve 38 a force from a lever 42 secured to the cam spindle 40, when the lever 42 is rotatable by the application of its free end of a force from mechanical applying means, suitably an inextensible cable assembly 43.

In the embodiment described above with reference to FIG. 6 movement between the strut 37 and the sleeve 38 in the application of the brake is utilised to effect automatic adjustment to compensate for wear of the friction pads 33 and 35. However, alternative automatic adjustment means of known design may be incorporated in the brake applying means.

The disc brake illustrated in FIGS. 7 to 11 of the drawings is similar to that illustrated in the embodiment of FIGS. 1 to 5 and corresponding reference numerals qualified by the suffix b have been applied to corresponding parts.

In the disc brake illustrated in FIGS. 7 to 11 the surfaces 19b and 20b on the caliper 12b are urged into engagement at all times with the shoulders 11b and 10b on the stationary member 1b by a pair of circumferentially spaced tension springs 44. A pair of bolts 45 are screwed through tapped holes at aligned intermediate points in the axial lengths of the arms 4b. The free end portion 46 of the shank of each bolt 45 which projects beyond the inner side face of that arm is reduced in diameter and is received in an axially extending recess 47 in a complementary part of the caliper 12b. Clearances are provided between the free ends of portions 46 and the bases of the recesses 47 when the bolts 45 are screwed home. The free end portion 46 of each shank forms an anchorage for the inner end of one of the tension springs 44, of which the outer end is anchored to a pin or peg 48 which extends axially in a rearward direction from a transverse face 49 at an intermediate point in the length of the limb 14b of the caliper.

In the event of failure in service of one or each of the tension springs 44, the engagement of the shank portion 46 of that bolt in the recess 47 into which it projects will act to prevent separation of the caliper 12b and the drag-taking member 1.

The indirectly actuated friction pad assembly 35b comprises a friction pad 50 carried by a rigid backing plate 51 which is detachably received in a recess in the limb 15b of the caliper 12b and is held against rotation by means of an axially extending piston 52.

The construction and operation of the brake illustrated in FIGS. 7 to 11 need not be described further herein as it is otherwise the same as the brake described above with reference to FIGS. 1 to 5.

The disc brake illustrated in FIGS. 12 to 15 is similar to that illustrated in FIGS. 1 to 6 and corresponding reference numerals qualified by the suffix c have been applied to corresponding parts.

In the disc brake illustrated in FIGS. 12 to 15 the hydraulic actuator comprises a pair of circumferentially spaced pistons 52 working in parallel bores 53 in the limb 14c.

The surfaces 19c and 20c on the caliper 12c are urged into engagement at all times with the shoulders 11c and 10c on the stationary member 1c by circumferentially spaced headed studs 54 extending through inclined openings 55 and 56 in the caliper 12c and the arm 4c, and compression springs 57 acting between spaced abutment plates 58 and 59 of which each plate 59 engages with a head at one end of a stud 54, and the plate 58 engages with a shoulder 60 surrounding the opening in the arm 4c through which that stud 54 extends.

The construction and operation of the brake illustrated in FIGS. 12 to 15 is otherwise the same as that described above with reference to FIGS. 1 to 6 and need not be described further herein.

The disc brake illustrated in FIGS. 16 to 19 is similar to that described above in the embodiment of FIGS. 1 to 5 and corresponding reference numerals qualified by the suffix d have been applied to corresponding parts.

In the disc brake illustrated in FIGS. 16 to 19 the caliper 12d is received between the guiding surfaces 7d, 8d and 9d on the arms 4d, and movement of the caliper 12d in a radially inwards direction is resisted by the engagement of the surfaces 19d on the caliper with the shoulders 11d at the innermost ends of the guiding members 4d. A bolt 61 is screwed through a tapped hole at an intermediate point in the axial length of the leading arm 4d. The free end portion 62 of the shank of the bolt 61 which projects beyond the inner side face of that arm is reduced in diameter and is received in an axially extending recess 63 in the caliper 12d. A clearance 64 is provided between the free end of the portion 62 and the base of the recess 63 when the bolt 61 is screwed home. The shank portion 62 provides a location for a compression spring 65 acting between the base of the recess 63 and a shoulder 66 at a step in the change in diameter in the shank of the bolt 61 to urge the end face 17 of the caliper into engagement at all times with the guiding surfaces 7, 8 and 9 of the trailing arm 4d.

The shank of the bolt 61 forms an anchorage for one end of a tension spring 67 of which the other end is anchored to the pin or peg 68 which extends axially in a rearward direction from a transverse face 69 at an intermediate point in the length of the limb 14d of the caliper 12d A further tension spring 70 located at the circumferentially opposite end of the brake is anchored at opposite ends between a corresponding peg 71 and an anchorage member 72 projecting inwardly from the trailing arm 4d at a position aligned with the bolt 61. The member 72 may comprise a pin or peg or a bolt similar to the bolt 61. In either case it is desirable that the member 72 is of a diameter equal to that of the shank portion 62 so that the tension springs 67 and 70 will be interchangeable.

The tension springs 67 and 70 serve to urge the caliper 12d inwardly at all times so that the shoulders 19d on the caliper 12d engage slidably at all times with the complementary shoulders 11d with which they have a sliding engagement in the application of the brake.

In the event of failure in service of at least the tension spring 67 the engagement of the shank portion 62 in the recess 63 will act to prevent separation of the caliper 12d and the drag-taking member 1d.

In a modification the separate compression spring 65 and the tension spring 67 may comprises a single spring with one end portion wound in a direction to form the compression spring 65.

The indirectly actuated friction pad assembly 32b comprises a friction pad 73 carried by a rigid backing plate 74. A pin 75 projecting through an opening at substantially the mid-point in the circumferential length of the limb 15d is received at its innermost end in a clearance hole in a radial lug 76 of the back plate 74. The radial outermost face of the backing plate 74 is urged into engagement with complementary circumferentially spaced shoulders 77 on the limb 15d by means of a spring 78 of Y outline which encircles a portion of the periphery of the pin 75 and is formed at the free end of its limbs with inwardly cranked portions 79 engaging with a pair of oppositely inclined shoulders 80 on the backing plate 74.

The construction and operation of the brake illustrated in FIGS. 16 to 19 need not be described further herein as it is otherwise the same as the brake described above with reference to FIGS. 1 to 6 of the drawings.

Figure 20:
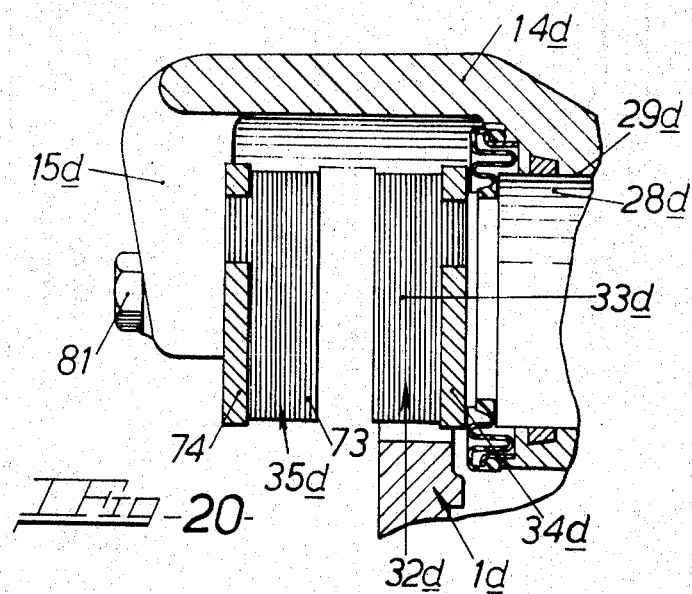
FIG. 20 is a section similar to FIG. 19 but showing a modification.
Figure 16:
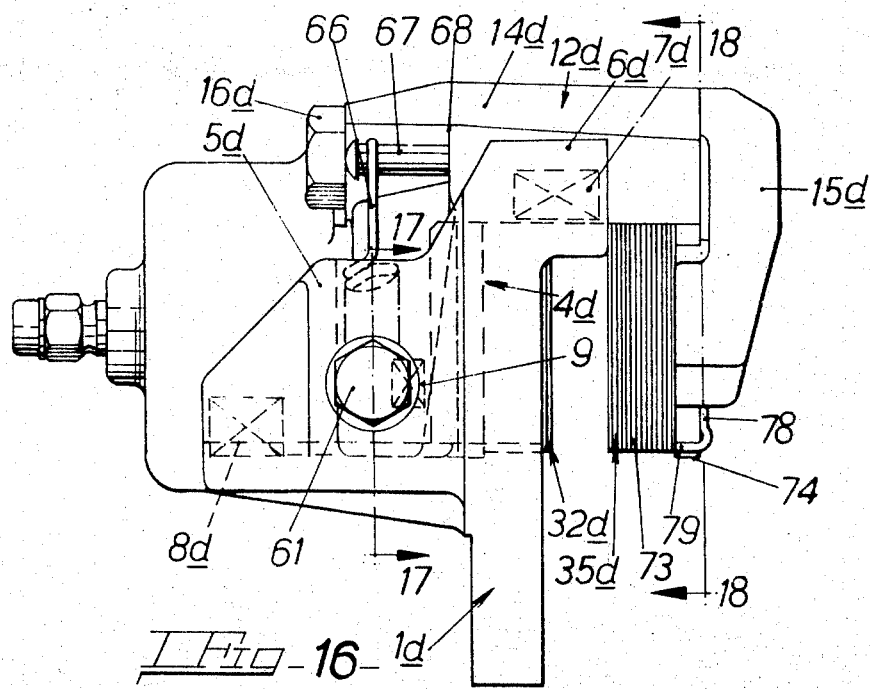
FIG. 16 is a side elevation of a further modified form of hydraulically operated disc brake.
Figure 17:
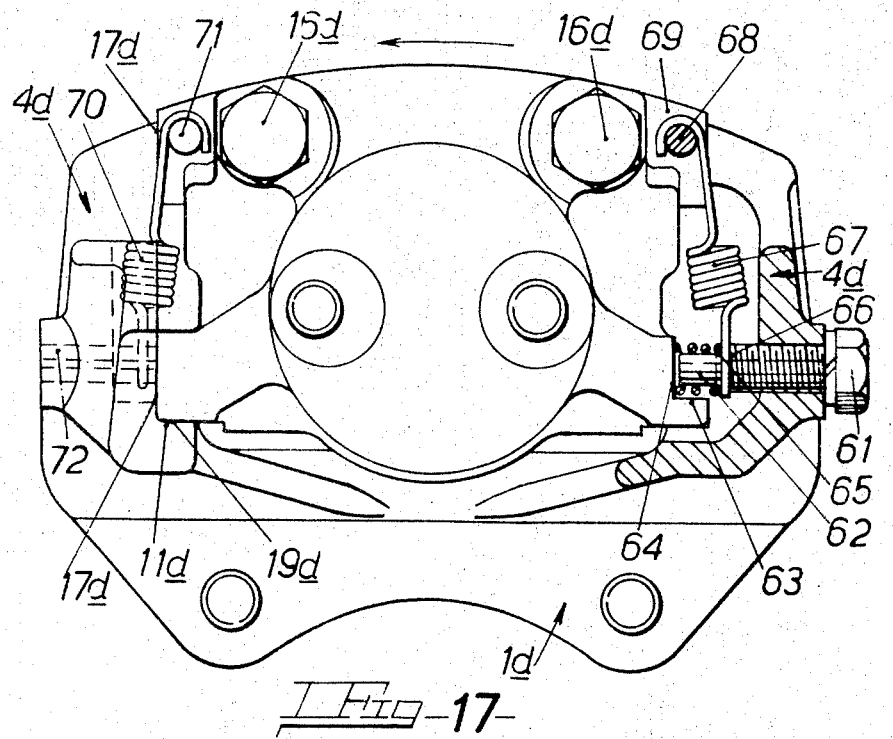
FIG. 17 is an elevation of one end of the brake illustrated in FIG. 16 including a part section through the stationary member on the line 17—17 of FIG. 1.

In the modification shown in FIG. 20 the indirectly actuated friction pad assembly 35d is secured to the limb 15d by means of a bolt 81 which is passed through an opening at substantially the mid point in the circumferential length of the limb 15d and screwed into a tapped hole in the backing plate 74. In this embodiment the limb 15d of the caliper is integral with the limb 14d.

I claim:

1. In a disc brake for a vehicle comprising a rotatable disc having opposite faces, a stationary drag-taking member adjacent to one face of said disc, a caliper straddling a portion of the peripheral edge of said disc and guided on said stationary drag-taking member for movement in a direction parallel with the axis of said disc, first and second friction pad assemblies for engagement with the said opposite faces of the said disc, and actuating means for applying said first friction pad assembly directly to one face of said disc, said second friction pad assembly being applied to the opposite face of said disc by the reaction of said applying means, the invention wherein said stationary drag-taking member includes a pair of circumferentially spaced guiding members, each comprising an arm, and an extension continuous with said arm and extending over said peripheral edge of said disc, and said guiding members have oppositely facing innermost faces, each innermost face being formed with at least three axially and radially spaced co-planar surfaces upon which said caliper is slidable guided directly for movement in said direction parallel with said axis of said disc, including coupling means co-operating with adjacent parts of said caliper and said stationary drag-taking member to limit movement of said caliper with respect to said stationary drag-taking member, at least in a radially outwards direction, said coupling means comprising a member which projects through an opening in an arm and which is received at its innermost end in a longitudinal extending groove in an adjacent face of said caliper, and there is a clearance between said innermost end of said member and the base of said groove in which it is received, a compression spring acting between said member and said base of said groove to urge into engagement complementary surfaces on said caliper and said drag-taking member at the circumferentially opposite end of said brake.

2. The invention as claimed in claim 1, wherein said member comprises a bolt screwed through a tapped opening in said arm and having a shank of which a portion terminating at its free innermost end is reduced in diameter whereby a shoulder defined by a step in a change in diameter forms an abutment for one end of said compression spring.

3. The invention as claimed in claim 1, wherein said compression spring is wound continuously with a tension spring, and said member forms an abutment for one end of said compression spring and an anchorage for one end of said tension spring, the opposite end of said tension spring being anchored to said caliper.

4. In a disc brake for a vehicle comprising a rotatable disc having opposite faces, a stationary drag-taking member adjacent to one face of said disc, a caliper straddling a portion of the peripheral edge of said disc and guided on said stationary drag-taking member for movement in a direction parallel with the axis of said disc, first and second friction pad assemblies for engagement with said opposite faces of said disc, means on said drag-taking member slideably supporting said first friction pad, means interconnecting said caliper and said second friction pad, and actuating means carried by said caliper for applying said first friction pad assembly directly to one face of said disc said second friction pad assembly being applied to the opposite face of said disc by the reaction of said caliper, the invention wherein said stationary drag-taking member includes a pair of circumferentially spaced guiding members, each comprising an arm, and an extension continuous with said arm and extending over said peripheral edge of said disc, and said guiding members have oppositely facing parallel innermost faces, each innermost face being formed with at least three axially and radially spaced integral discrete co-planar surfaces upon which said caliper is slidably guided directly for movement in said direction parallel with said axis of said disc, two of said co-planar surfaces are located at portions which terminate at axially opposed ends of each guiding member, and a third of said co-planar surfaces is located at a position intermediate the opposed ends of each guiding member.

5. The invention as claimed in claim 4, wherein an end of each extension remote from said arm terminates at a position at least substantially in alignment with said face of said disc remote from said stationary drag-taking member.

6. The invention as claimed in claim 4, wherein said arms at least at their innermost ends lead into inwardly extending shoulders which form supports preventing movement of said caliper with respect to said stationary drag-taking member, at least in a radially inwards direction.

7. A disc brake as claimed in claim 4, wherein said arms at their innermost and outermost ends lead into inwardly and outwardly extending shoulders which form supports preventing movement of said caliper with respect to said stationary drag-taking member, at least in a radially inwards direction.

8. The invention as claimed in claim 4, wherein each arm is provided in its innermost face with a longitudinally extending groove in which is received one of a pair of circumferentially spaced adjustable tongues carried by said caliper.

9. The invention as claimed in claim 4, wherein each arm includes a lug having an opening aligned with an opening in a complementary lug in said caliper, and each of a pair of circumferentially spaced studs extend through aligned openings in a pair of complementary lugs.

10. The invention as claimed in claim 4 including coupling means co-operating with adjacent parts of said caliper and said stationary drag-taking member to limit movement of said caliper with respect to said stationary drag-taking member, at least in a radially outwards direction.

11. The invention as claimed in claim 10, wherein said coupling means comprises an adjustable tongue carried by the caliper and received in a longitudinally extending groove located at an intermediate point in the radial depth of said circumferentially innermost face of an adjacent arm.

12. The invention as claimed in claim 11 wherein said tongue forms part of a tab washer carried by said caliper and a tension spring acts between said tab washer and said stationary drag-taking member to urge said caliper into engagement with inwardly directed shoulders at the innermost ends of said arms.

13. The invention as claimed in claim 10, wherein said coupling means comprises a member which projects through an opening in an arm and which is received at its innermost end in a longitudinally extending groove in an adjacent face of said caliper.

14. The invention as claimed in claim 13, wherein each arm is formed with an opening through which a member projects, and each member is received at its innermost end in a longitudinally extending groove in an adjacent face of said caliper.

15. The invention as claimed in claim 13, wherein said member forms an anchorage for one end of a tension spring of which the other end is anchored to said caliper whereby said caliper is urged into engagement with at least inwardly directed shoulders at innermost ends of the arms.

16. The invention as claimed in claim 10, wherein said coupling means comprises a stud extending through aligned openings in complementary lugs in said caliper and in an arm of said stationary drag-taking member.

17. The invention as claimed in claim 16, wherein said stud is loaded by a compression spring which acts in a direction to urge said caliper into engagement with inwardly directed shoulders at least at the innermost ends of said arms.

18. The invention as claimed in claim 17, wherein said compression spring acts between an outer face of said lug on said arm and a free end of said stud which is adjacent to the said face.

* * * * *